United States Patent Office 2,886,205
Patented May 12, 1959

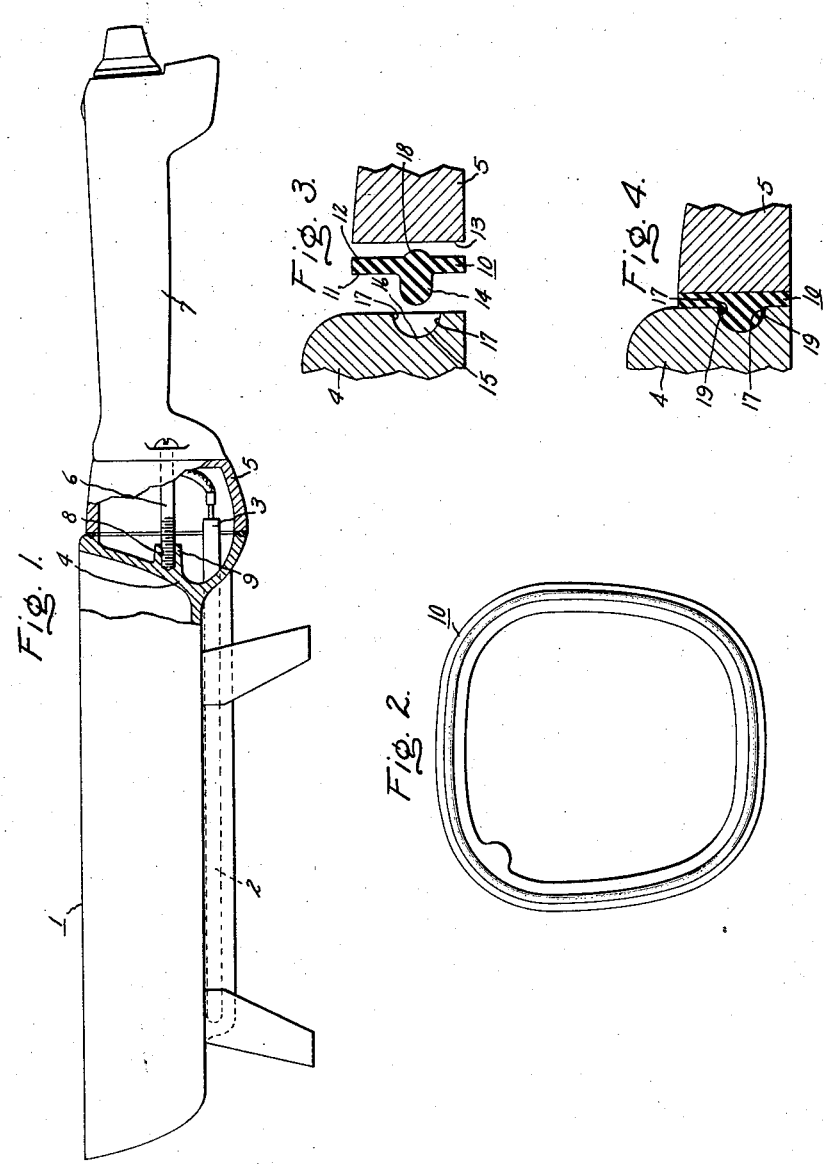

2,886,205

THERMOSTAT COVER SEAL

Otto F. Gerry, Brockport, N.Y., assignor to General Electric Company, a corporation of New York Application March 28, 1957, Serial No. 649,089

5 Claims. (Cl. 220—94)

This invention relates to liquid-tight seals and more particularly, to electric cooking vessel seals of the type used for sealing the housings or covers of electrical components, such as heater terminals, thermostatic switch mechanisms, and the like, to a cooking vessel to permit immersion of the vessel for cleaning.

The formation of a satisfactory liquid-tight seal of the type mentioned above involves many problems, one of which deals with the expansion and contraction of the cooking vessel upon heating of the vessel, as such expansion and contraction tends to loosen the seal and permit leakage. When the cooking utensil is being washed and strikes a sink or is subjected to other shock loads, the seal is apt to be impaired. Also, where the seal is formed by forceful compression of an unconfined rubber-like washer or by a rubber-like washer that is initially confined so as to completely fill a receiving recess formed by the parts to be sealed, the rubber tends to flow at usual cooking temperatures and on cooling takes a permanent set in a distorted configuration, which is likely to result in impairment of the seal.

Accordingly, it is a primary object of the invention to provide a new and improved liquid-tight electric cooking vessel seal which avoids the above-mentioned difficulties.

In accordance with one aspect of this invention, a resilient rubber-like washer having opposed flat faces is provided for engaging a cooking vessel wall and a flat edge of a cover, respectively. A bead is formed on one of the faces of the washer and is positioned within an annular groove formed in the cooking vessel wall. Pressure is applied to the cover for forcing the bead into intimate contact with the groove, but the bead and groove are dimensioned so as to provide gaps therebetween on initially being fully assembled to allow for expansion of the bead wholly within the groove on subsequent heating of the cooking vessel. By this arrangement, a reliable, effective, liquid-tight cooking vessel seal is provided which is sufficiently rugged to allow the cooking vessel to be immersed for washing without any danger of water leaking past the seal.

Other objects and attendant advantages of this invention will be apparent from the following description taken in connection with the accompanying drawing in which:

Fig. 1 is a side elevational view partially in cross section of an electric skillet provided with my improved seal;

Fig. 2 is an elevational view of a rubber-like washer employed in my improved seal;

Fig. 3 is an enlarged partial cross sectional view of one form of my invention partially assembled; and Fig. 4 is an enlarged partial cross sectional view of the invention completely assembled.

Referring now to Fig. 1 of the drawing, there is illustrated an electric cooking vessel 1 having a heating element 2 embedded in the lower portion thereof. The terminal ends 3 of the heating element extend through a side wall 4 of the cooking vessel. A thermostatic switch mechanism (not shown) may be suitably mounted on the side wall 4 of the vessel adjacent to the terminal ends of the heating element 2. A cup-shaped cover 5 is provided for housing the heating element terminals and the thermostatic switch mechanism. Elongated screws 6 or other suitable securing means may be passed through openings formed in a handle 7, through cover 5, and screwed into holes 8 formed within lugs 9 for mounting handle 7 and thermostat cover 5 on side wall 4 of the cooking vessel.

I provide new and improved means for effecting a water-tight seal between cover 5 and side wall 4 of the cooking vessel so that the vessel may be immersed in liquid for washing without any danger of liquid passing through the seal and onto the thermostatic switch mechanism or the heating element terminals 3. As shown in Fig. 2, this means includes a uniquely formed and dimensioned resilient washer 10 which is positioned between the cooking vessel wall 4 and the thermostat cover 5. As shown in Fig. 3, resilient washer 10 has opposed flat faces 11 an 12 for engaging the cooking vessel wall 4 and a flat edge portion 13 of cover plate 5, respectively. Washer 10 is preferably formed of silicone rubber. In order to provide an effective seal in spite of the flowable nature of silicone rubber at elevated pressures and cooking vessel temperatures, a bead 14 is provided on the side surface 11 of the washer for cooperating with a groove 15 which is formed in the skillet wall 4. The bead 14 which may be approximately $\frac{1}{16}$ of an inch in height, fits into the seal groove 15. As shown in Figs. 2 and 3, bead 14 is essentially ring-shaped with a cross sectional height greater than the depth of groove 15 and a cross sectional width less than the width of groove 15. This dimensional relationship allows the bead 14 to press down on the bottom surface 16 of groove 15 to provide an effective seal, but still permits the bead room to expand when the skillet is operating at high temperatures, because it provides gaps 19 for allowing such expansion. A small bead 18 may be provided on the opposite side surface 12 of the washer so that a high unit pressure may be developed in a small area to effect a seal between the washer 10 and the flat edge 13 of the thermostat cover. This pressure is also useful in properly forcing bead 14 against the bottom surface 16 of groove 15. The wide flange area between the flat portions of the washer permits the pressure needed to hold the handle 7 tight to be distributed over a wide area. Further, this flat flange portion is relatively thin, preferably approximately $\frac{1}{32}$ of an inch. This minimizes any permanent set in the silicone rubber so that it becomes negligible.

In operation, when elongated screws 6 are tightened, thermostat cover 5 will be caused to move toward the side surface 4 of skillet 1, the flat edge portion of the skillet cover which is preferably approximately $\frac{3}{16}$ of an inch wide, engages small bead 18 and pushes large bead 14 into intimate contact with the bottom surface 16 of groove 15. Upon further tightening, the flat surfaces of washer 10 engage the flat surfaces of the thermostat cover 5 and the cooking vessel wall 4. Referring now to Fig. 4, after the screws are adequately tightened for holding the handle to the vessel and for providing a seal, gaps 19 remain between the sides of bead 14 and the side surfaces 17 of groove 15. When the skillet is operated at elevated temperatures, the silicone rubber expands to fill these gaps 19 and the seal remains unimpaired. By this arrangement, a very simple yet effective seal is achieved.

When it is desired to wash the cooking vessel, washer 10 provides an effective water-tight seal between the vessel and the thermostat cover, thereby protecting the thermostatic switch mechanism and other electrical components.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A liquid-tight cooking vessel seal comprising: a cooking vessel wall; an annular groove having a bottom surface and side surfaces formed in said wall; a cover having a flat uninterrupted edge portion; a resilient washer having opposed flat faces for engaging said cooking vessel wall and the flat edge portion of said cover, respectively; a bead formed on one face of said washer and positioned in said annular groove; and means for applying pressure on said cover for forcing said bead against a limited area of the groove surfaces, whereby after the application of pressure on initial assembly of the parts said bead is in sealing contact with a portion of the groove surfaces but is of smaller cross-sectional area than the groove and thereby forms a gap between the groove surfaces and said bead so that when the cooking vessel is subsequently operated at high temperatures the bead may expand into additional contact with the groove surfaces.

2. A liquid-tight cooking vessel seal comprising: a cooking vessel wall; an annular groove having a bottom surface and side surfaces formed in said wall; a cover having a flat uninterrupted edge portion; a resilient washer having opposed flat faces for engaging said cooking vessel wall and said flat edge portion, respectively; a bead formed on one face of said washer and positioned in said groove, said bead being essentially ring-shaped with a cross-sectional height greater than the depth of said groove and a cross-sectional width less than the width of said groove prior to assembly of the parts; and means for applying pressure to said cover for forcing said bead into intimate contact with said bottom surface of said groove; said bead being dimensioned relative to said groove so as to be spaced from said side surfaces of the groove after the application of pressure on initial assembly of the parts, whereby said bead is allowed to expand into contact with said side surfaces of the groove when the cooking vessel is subsequently operated at high temperatures.

3. A liquid-tight cooking vessel seal comprising: a cooking vessel wall; an annular groove having a bottom surface and side surfaces formed in said wall; a cover having a flat uninterrupted edge portion; a resilient washer having opposed flat faces for engaging said cooking vessel wall and said flat edge portion, respectively; a bead formed on one face of said washer and positioned in said groove, said bead being essentially ring-shaped with a cross-sectional height greater than the depth of said goove and a cross-sectional width less than the width of said groove prior to assembly of the parts; means for applying pressure to said cover for forcing said bead into intimate contact with said bottom surface of said groove; said bead being dimensioned relative to said groove so as to be spaced from said side surfaces of the groove after the application of pressure on initial assembly of the parts, whereby said bead is allowed to expand into contact with said side surfaces of the groove when the cooking vessel is subsequently operated at high temperatures; and a second bead formed on the other face of said washer opposite to said first bead for cooperating with said cover to develop a high unit pressure in the area of said beads when pressure is applied on said cover.

4. A liquid-tight cooking vessel seal comprising: a cooking vessel wall; an annular groove having a bottom surface and side surfaces formed in said wall; a cover having a flat uninterrupted edge portion; a resilient washer having opposed flat faces for engaging said cooking vessel wall and the flat portion of said cover, respectively; a bead formed on one face of said washer, said bead being positioned in said annular groove; a handle connected to said cover; and screw means extending through said handle and cover for applying pressure on said cover for forcing said bead into intimate contact with said bottom surface of the groove; said bead being dimensioned relative to said groove so as to be spaced from said side surfaces of the groove after the application of pressure on initial assembly of the parts, whereby said bead is allowed to expand into contact with said side surfaces of the groove when the cooking vessel is subsequently operated at high temperatures.

5. A liquid-tight cooking vessel seal comprising: a cooking vessel wall; an annular groove having a bottom surface and side surfaces formed in said wall; a cover having a flat uninterrupted edge portion; a resilient washer having opposed flat faces for engaging said cooking vessel wall and said flat edge portion of said cover, respectively; a bead formed on one face of said washer positioned in said groove, said bead being essentially ring-shaped with a cross-sectional height greater than the depth of said groove and a cross-sectional width less than the width of said groove prior to assembly of the parts; a handle connected to said cover; and screw means extending through said handle and said cover for applying pressure to said cover for forcing said bead into intimate contact with said bottom surface of the groove; said bead being dimensioned relative to said groove so as to be spaced from said side surfaces of the groove after the application of pressure on initial assembly of the parts, whereby said bead is allowed to expand into contact with the side surfaces of said groove when the cooking vessel is subsequently operated at high temperatures.

References Cited in the file of this patent

UNITED STATES PATENTS

| | | |
|---|---|---|
| 1,333,760 | Lamb | Mar. 16, 1920 |
| 2,383,089 | Theiler | Aug. 21, 1945 |
| 2,530,643 | Berg | Nov. 21, 1950 |
| 2,777,154 | Kircher | Jan. 15, 1957 |

FOREIGN PATENTS

| | | |
|---|---|---|
| 9,971 | Great Britain | of 1909 |
| 1,035,065 | France | Apr. 15, 1953 |
| 1,068,401 | France | Feb. 3, 1954 |